United States Patent
Jain et al.

(10) Patent No.: US 11,546,230 B2
(45) Date of Patent: Jan. 3, 2023

(54) REAL TIME STREAMING ANALYTICS PLATFORM

(71) Applicant: Impetus Technologies, Inc., Los Gatos, CA (US)

(72) Inventors: Ankit Jain, Madhya Pradesh (IN); Aashu Mahajan, Los Gatos, CA (US); Punit Shah, Los Gatos, CA (US); Rakesh Kumar Rakshit, Madhya Pradesh (IN); Sanjeev Kumar, Los Gatos, CA (US); Saurabh Dutta, Madhya Pradesh (IN); Sumit Sharma, Los Gatos, CA (US)

(73) Assignee: IMPETUS TECHNOLOGIES, INC., Los Gatos, CA (US)

( * ) Notice: Subject to any disclaimer, the term of this patent is extended or adjusted under 35 U.S.C. 154(b) by 531 days.

(21) Appl. No.: 14/859,503

(22) Filed: Sep. 21, 2015

(65) Prior Publication Data
US 2016/0085399 A1 Mar. 24, 2016

Related U.S. Application Data

(60) Provisional application No. 62/052,668, filed on Sep. 19, 2014.

(51) Int. Cl.
*H04L 41/22* (2022.01)
*H04L 65/80* (2022.01)
*G06F 8/34* (2018.01)

(52) U.S. Cl.
CPC ............... *H04L 41/22* (2013.01); *G06F 8/34* (2013.01); *H04L 65/80* (2013.01)

(58) Field of Classification Search
CPC .......... G06F 8/34; G06F 3/04817; G06F 8/20; G06F 8/30; G05B 2219/23258;
(Continued)

(56) References Cited

U.S. PATENT DOCUMENTS 5,237,691 A * 8/1993 Robinson ............... G06F 8/30
                                                                717/107
7,370,315 B1 * 5/2008 Lovell ............... G06F 11/3664
                                                                717/109
(Continued)

FOREIGN PATENT DOCUMENTS

WO    WO 2014108901 A1 * 7/2014 ............... G06F 8/34

OTHER PUBLICATIONS

Vitria Technology Inc., Vitria OI for Streaming Analytics: Architectural Overview, 2014, Number of pp. 23, USA.

*Primary Examiner* — Kieu D Vu
*Assistant Examiner* — Blaine T Basom
(74) *Attorney, Agent, or Firm* — Hayes Soloway P.C.

(57) ABSTRACT

System(s) and method(s) for processing one or more real time data streams captured in a distributed computing environment. In accordance with the system(s) and method(s), a GUI may be provided that enables a user to design a GUI pipeline comprising multiple sub-systems executing logic associated with a plurality of applications. Each of the sub-systems in the pipeline may be configured with different parameters by the user using the GUI. Further, the user may configure to integrate the multiple sub-systems through the GUI. Further, the user may control and/or update the configuration of the logic, configuration of the parameters, and the integration of the multiple sub-systems through the GUI. The updating of the configuration is automatically notified to the running pipeline in real time. Further, the GUT facilitates to monitor performance of the running pipeline in real time.

20 Claims, 7 Drawing Sheets

(58) Field of Classification Search
CPC ......... H04L 41/22; H04L 65/80; H04L 43/08; H04L 43/045
See application file for complete search history.

(56) References Cited

U.S. PATENT DOCUMENTS

| | | | |
|---|---|---|---|
| 7,529,764 B2 | 5/2009 | Gutsche | |
| 8,069,190 B2 | 11/2011 | McColl et al. | |
| 8,732,300 B2 | 5/2014 | Barsness et al. | |
| 8,788,928 B2 | 7/2014 | McColl et al. | |
| 9,098,310 B2* | 8/2015 | Ranganathan | G06F 8/10 |
| 9,262,141 B1* | 2/2016 | Orofino, II | G06F 9/5066 |
| 9,674,249 B1* | 6/2017 | Kekre | H04L 65/60 |
| 9,740,802 B2* | 8/2017 | Nixon | G06F 17/5009 |
| 2002/0196283 A1* | 12/2002 | Petruk | G06F 8/34 715/763 |
| 2004/0034696 A1* | 2/2004 | Joffrain | G06F 8/34 709/217 |
| 2004/0107414 A1* | 6/2004 | Bronicki | G06F 8/34 717/105 |
| 2006/0059461 A1* | 3/2006 | Baker | G06F 8/20 717/113 |
| 2007/0005613 A1* | 1/2007 | Singh | G06Q 20/40 |
| 2008/0134158 A1* | 6/2008 | Salz | G06F 8/34 717/148 |
| 2008/0313573 A1* | 12/2008 | Nelson | G06F 8/34 715/854 |
| 2009/0100407 A1* | 4/2009 | Bouillet | G06F 8/34 717/105 |
| 2009/0198736 A1* | 8/2009 | Shen | G06F 17/30339 |
| 2010/0306736 A1* | 12/2010 | Bordelon | G06F 8/452 717/109 |
| 2011/0029485 A1* | 2/2011 | Park | G06F 16/2358 707/634 |
| 2012/0084317 A1* | 4/2012 | Sakamoto | G06Q 40/04 707/769 |
| 2012/0254174 A1* | 10/2012 | Mitra | G06F 17/30091 707/737 |
| 2014/0006338 A1 | 1/2014 | Watson et al. | |
| 2014/0149895 A1* | 5/2014 | Bardhan | G06F 17/30592 715/763 |

* cited by examiner

REAL TIME STREAMING ANALYTICS PLATFORM

CROSS REFERENCE TO RELATED APPLICATION

This application claims benefit of U.S. Provisional Application Ser. No. 62/052,668, entitled, "Real Time Streaming Analytics Platform" filed Sep. 19, 2014, the entire disclosure of which is incorporated herein by reference.

TECHNICAL FIELD

The present disclosure described herein, in general, relates to real time data analytics, and more particularly to a system and method for processing one or more real time data streams captured in a distributed computing environment.

BACKGROUND

Real time streaming analytics helps in deriving valuable insights to different enterprises based upon analysis of real time streaming data. The enterprises may take informed decisions based on the insights derived from the analysis of the real time streaming data. As of today, there are two classes of enterprise solutions catering the needs of the real time streaming analytics. The two classes include enterprise systems and open source systems. The open source systems facilitate to use open source technologies such as Apache™ Hadoop® and Apache™ Storm to implement the real time streaming analytics.

However, there are certain technical challenges associated with implementation of the enterprise systems and the open source systems facilitating the real time streaming analytics. For instance, users using these systems may need to be aware about coding aspects of various technologies and underlying infrastructure associated with the implementation of the real time streaming analytics. For instance, in case of the open source systems, the users need to have in-depth knowledge about the open source technologies including Apache™ Hadoop®, Apache™ Storm, Apache™ Kafka, and the like. The users need to write various codes for building topology and/or pipeline. Another technical challenge is to frequently modify the codes and re-configure the underlying infrastructure in case the functionality of any component in the topology or pipeline is to be modified in real time. Further, after modifying the code, the code modified may have to be recompiled so that it can be used for the execution of streaming analytics applications.

SUMMARY

This summary is provided to introduce aspects related to systems and methods for processing one or more real time data streams captured in a distributed computing environment and the concepts are further described below in the detailed description. This summary is not intended to identify essential features of disclosure nor is it intended for use in determining or limiting the scope of the disclosure.

In one implementation, a system for processing one or more real time data streams captured in a distributed computing environment is disclosed. The system may comprise a hardware processor and a memory coupled to the hardware processor. The hardware processor may be configured to execute computer-executable instructions stored in the memory. The hardware processor may be configured to execute a computer-executable instruction for providing a graphical user interface (GUI) in order to design a graphical pipeline containing a plurality of graphical components. In one aspect, each of the plurality of graphical components may indicate a phase in a pipeline that is capable of being operated in a distributed computing environment. Further, the hardware processor may be configured to execute a computer-executable instruction for configuring at least one of a parameter, a rule and logic for each of the plurality of graphical components on the GUI. In an aspect, the at least one of the parameter, the rule and the logic may be configured based upon a type of each graphical component. Further, the at least one of the parameter, the rule and the logic may be configured to enable at least one processing unit, in the pipeline, to perform one or more computational tasks corresponding to each graphical component. Furthermore, the hardware processor may be configured to execute a computer-executable instruction for configuring at least one application based upon the configuration of the at least one of the parameter, the rule and the logic. In an aspect, the at least one application being configured may be further executed via one or more processing units in the pipeline. The execution of the at least one application may further enable the one or more processing units, in the pipeline, to perform a series of computational tasks in order to process one or more real time data streams captured in the distributed computing environment.

In another implementation, a method for processing one or more real time data streams captured in a distributed computing environment is disclosed. The method may comprise providing a graphical user interface (GUI) in order to design a graphical pipeline containing a plurality of graphical components. In one aspect, each of the plurality of graphical components may indicate a phase in a pipeline that is capable of being operated in a distributed computing environment. Further, the method may comprise configuring at least one of a parameter, a rule and logic for each of the plurality of graphical components on the GUI. In an aspect, the at least one of the parameter, the rule and the logic may be configured based upon a type of each graphical component. Further, the at least one of the parameter, the rule and the logic may be configured to enable at least one processing unit, in the pipeline, to perform one or more computational tasks corresponding to each graphical component. Furthermore, the method may comprise configuring at least one application based upon the configuration of the at least one of the parameter, the rule and the logic. In an aspect, the at least one application being configured may be further executed via one or more processing units in the pipeline. The execution of the at least one application may further enable the one or more processing units, in the pipeline, to perform a series of computational tasks in order to process one or more real time data streams captured in the distributed computing environment. In an embodiment, the aforementioned method may be performed by a hardware processor using computer-executable instructions stored in a memory.

In yet another implementation, non transitory computer readable medium embodying a program executable in a computing device for processing one or more real time data streams captured in a distributed computing environment is disclosed. The program may comprise a program code for providing a graphical user interface (GUI) in order to design a graphical pipeline containing a plurality of graphical components. In one aspect, each of the plurality of graphical components may indicate a phase in a pipeline that is capable of being operated in a distributed computing environment. Further, the program may comprise a program code for configuring at least one of a parameter, a rule and logic for each of the plurality of graphical components on the GUI. In an aspect, the at least one of the parameter, the rule and the logic may be configured based upon a type of each graphical component. Further, the at least one of the parameter, the rule and the logic may be configured to enable at least one processing unit, in the pipeline, to perform one or more computational tasks corresponding to each graphical component. Furthermore, the program may comprise a program code for configuring at least one application based upon the configuration of the at least one of the parameter, the rule and the logic. In an aspect, the at least one application being configured may be further executed via one or more processing units in the pipeline. The execution of the at least one application may further enable the one or more processing units, in the pipeline, to perform a series of computational tasks in order to process one or more real time data streams captured in the distributed computing environment.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
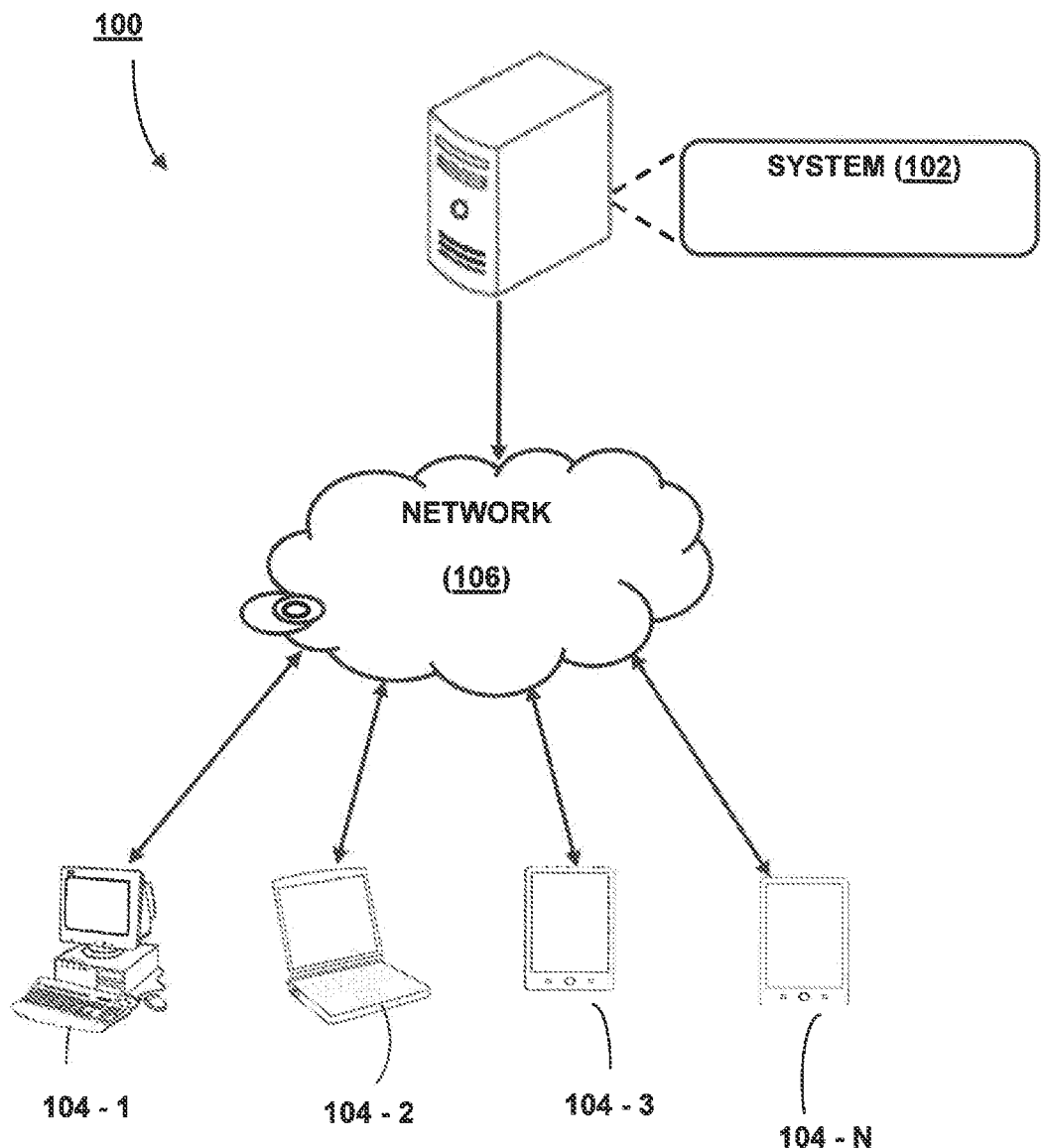
FIG. 1 illustrates a network implementation of a system for processing one or more real time data streams captured in a distributed computing environment, in accordance with an embodiment of the present disclosure.

System(s) and method(s) for processing one or more real time data streams captured in a distributed computing environment are described. According to the system(s) and the method(s) of the present disclosure, a real time streaming analytics platform (hereinafter referred to as platform) may be provided for developing a plurality of applications). The plurality of applications may be developed on top of Open Source Technology such as Apache™ Storm. The applications are developed without requiring in-depth knowledge of the Apache™ Storm Technology. The platform provides a Graphical User Interface (GUI) that facilitates the developing of the plurality of applications.

In one embodiment, the plurality of Applications may be developed to process and analyze one or more data streams data received on the platform in real time. The applications may perform varied functionalities and/or processes. In order to enable the functionalities and/or processes, the GUI facilitates a user to design a graphical pipeline of a plurality of graphical components collectively performing the functionalities and/or processes. The plurality of graphical components may contain logics associated with the execution of the functionalities and/or processes of the plurality of applications. The plurality of graphical components may be of different types. More specifically, the graphical components may be of types including processor components, channel components, data store components and emitter components. Further, at least two of these components, in the graphical pipeline, may be connected via a connection having a predefined condition. In one aspect, each of the graphical components, in the graphical component, may represent a phase in a running pipeline of processing units employed in a distributed computing environment.

In an embodiment, the plurality of processor components may comprise a parser processor, a complex event processing (CEP) processor (hereinafter referred as CEP processor), a custom processor, a predictive modeling markup language (PMML) processor (hereinafter referred as PMML processor), a filter processor, an index processor, a persistence processor, an alert processor, an enricher processor and the like. The user may configure parameters associated with each of the plurality of processor components through the GUI. In one example, the user may configure a message structure of a plurality of messages received to be parsed by the parser processor. The plurality of messages may be received from the channel components. More particularly, the plurality of messages may be received from the channel components including Apache™ Kafka or RabbitMq™. The Apache™ Kafka or RabbitMq™ may act as channels buffering the one or more data streams in form of the plurality of messages. In an embodiment, various fields associated with the plurality of messages may be enriched by the enricher processor. In one embodiment, the plurality of messages parsed may be subjected to custom processing using the custom processor. The user may apply a custom logic and/or rule on the custom processor in order to process the plurality of messages. The custom logic and/or rule may be configured by the user using the GUI. The custom logic and/or rule indicate operation to be performed by the custom processor. Based upon the operation performed, the alert processor may be configured for sending notification alerts to the stakeholders. The notification alerts indicate actions to be taken in view of the analysis performed by the execution of the custom logic. The filter processor may enable filtering of data and/or messages to be processed based upon a filtering condition predefined on respective processor(s). In real time, one or more data streams being processed may be indexed and/or stored using the index processor and the persistence processor respectively. Further, based upon analysis of data, the PMML processor may apply predictive analytics algorithm to suggest recommendations to the stakeholders. Further, the emitter components on the GUI may be configured to transfer the data processed to external systems or third party systems. The emitter components may comprise at least one of a Kafka Producer, a Router, a RabbitMQEmitter and a StreamingEmitter.

In one embodiment, the channel components including the Apache™ Kafka or RabbitMq™, the plurality of processor components, the data store components and the emitter components may be present in form of multiple components on the GUI. The user may drag and drop each of these components on a canvas of the GUI to design the graphical pipeline. Once the graphical pipeline is designed, a real time pipeline containing a cluster of processing units (or computing nodes) preconfigured by a cluster monitoring tool may be utilized to execute the applications configured using the GUT pipeline. At any time, the user may reconfigure the messages, the business logics and the alerts. The real time pipeline in the cluster may be able to respond to these reconfigurations of the messages, the business logics and the alerts automatically in real time. Further, the GUI provides various metrics associated with the performance of each of the computing nodes in the cluster.

While aspects of described system and method for processing one or more real time data streams captured in a distributed computing environment may be implemented in any number of different computing systems, environments, and/or configurations, the embodiments are described in the context of the following exemplary system.

Referring to FIG. 1, a network implementation 100 of a system 102, hereinafter also referred as a real-time streaming analytics platform, for processing one or more real time data streams captured in a distributed computing environment is illustrated, in accordance with an embodiment of the present disclosure. In one embodiment, the system 102 facilitates to develop and deploy real time applications capable of processing and analyzing real time data stream(s) received from heterogeneous resources.

Although the present disclosure is explained considering that the system 102 is implemented as a real-time streaming analytics platform, it may be understood that the system 102 may also be implemented as a variety of computing systems, such as a laptop computer, a desktop computer, a notebook, a workstation, a mainframe computer, a server, a network server, a tablet, a mobile phone, a robot and the like. In one implementation, the system 102 may be implemented in a cloud-based environment. It will be understood that the system 102 may be accessed by multiple users through one or more user devices 104-1, 104-2 . . . 104-N, collectively referred to as a user 104 hereinafter, or applications residing on the user devices 104. Examples of the user devices 104 may include, but are not limited to, a portable computer, a personal digital assistant, a handheld device, and a workstation.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
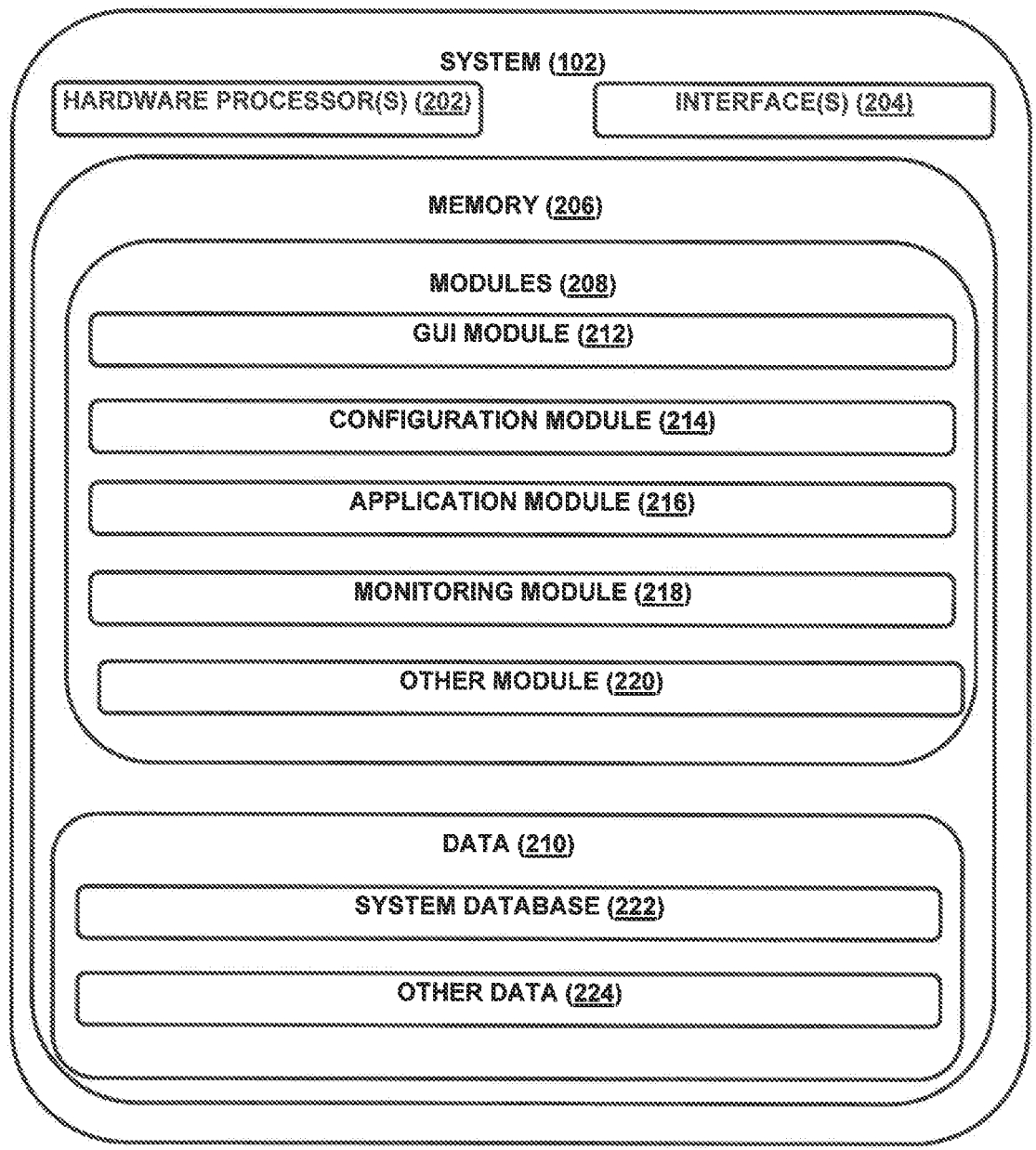
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one hardware processor 202, an input/output (I/O) interface 204, and a memory 206. The at least one hardware processor 202 may be implemented as one or more microprocessors, microcomputers, microcontrollers, digital signal processors, central processing units, state machines, logic circuitries, and/or any devices that manipulate signals based on operational instructions. Among other capabilities, the at least one hardware processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. The modules 208 may comprise a graphical user interface module 212 (hereinafter referred as GUI module 212), a configuration module 214, an application module 216, a monitoring module 218 and other module 220. The data 210, amongst other things, serves as a repository for storing data processed, received, and generated by the modules 208. The data 210 may also include a system database 222 and other data 224. The other data 224 may include data generated as a result of the execution of one or more modules of the other modules 220.

In one implementation, at first, a user may use the user device 104 to access the system 102 via the I/O interface 204. The user may register them using the I/O interface 204 in order to use the system 102. The working of the system 102 (hereinafter referred as real-time streaming analytics platform 102) may be explained in detail referring to FIGS. 3-6 as explained below.

Figure 3:
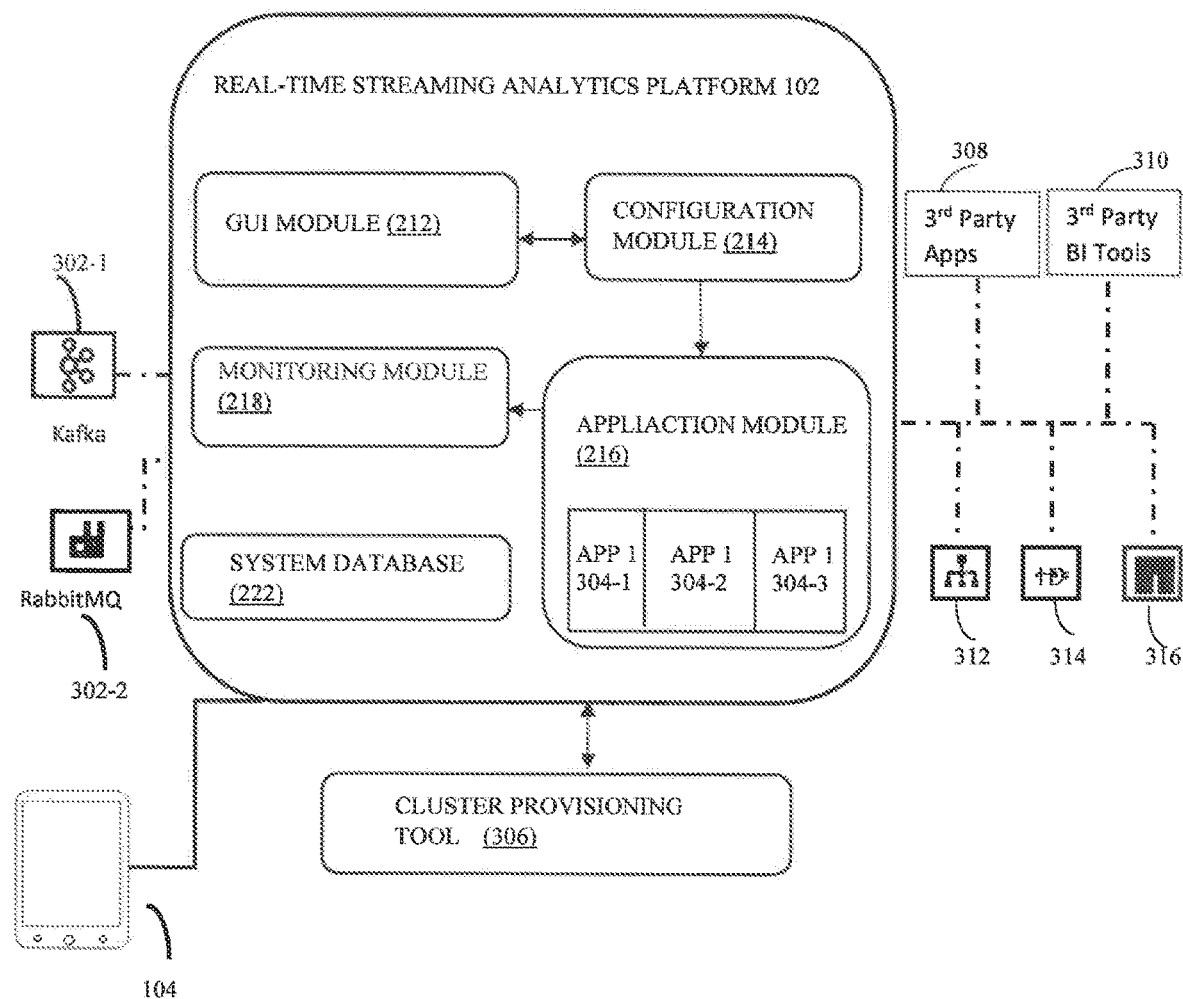
FIG. 3 illustrates the system along with other components facilitating the processing one or more real time data streams, in accordance with an embodiment of the present disclosure.

FIG. 3 illustrates architecture of the real-time streaming analytics platform 102 along with other components required for the real time streaming analytics in accordance with an embodiment of the present disclosure. As shown in FIG. 3, open source components including Apache™ Kafka 302-1 and RabbitMq™ 302-2 may receive one or more data streams (hereinafter referred as streaming data) from different resources. In one example, the Apache™ Kafka 302-1 and the RabbitMq™ 302-2 may receive the streaming data from stock exchanges worldwide including New York Stock Exchange (NYSE), Bombay Stock Exchange (BSE), National Stock Exchange (NSE), and the like. The streaming data may contain information about stocks of various companies. The streaming data may be received continuously in real time at a span of seconds, or milliseconds, or alike.

In one embodiment, the Apache™ Kafka 302-1 and the RabbitMq™ 302-2 may buffer or queue the streaming data to be processed for real time data analytics. The streaming data buffered may be processed by the real-time streaming analytics platform 102 in order to perform real time streaming analytics. The real-time streaming analytics platform 102 functions based upon Apache™ Storm Technology. The present disclosure facilitates to develop a plurality of applications on top of the real-time streaming analytics platform 102 using the application module 216 that would cater to specific requirements of the user. FIG. 3 illustrates few of the applications including APP1 304-1, APP2 304-2 and APP3

304-3. In one example, one of the applications may be an alerting application that alerts the stakeholders when a stock associated with a particular company falls below a predefined value. Similarly, another application may recommend marketing strategies to be adopted for selling products and solutions of an enterprise. The platform 102 is generic and is capable of developing applications of different domains having different functionalities.

In an embodiment, the development of the plurality of apps (e.g. APP1 304-1, APP2 304-2 and APP3 304-3) may be provisioned through the Application module 216. In order to facilitate the development and creation of the plurality of applications, initially, a graphical user interface (GUI) may be provided by the GUI module 212 in order to design pipeline containing a plurality of graphical components. In an aspect, each of the plurality of graphical components indicates a phase in a running pipeline that may be operated in a distributed computing environment. The plurality of graphical components may be of varied types and include processor components, channel components, data store components and emitter components. In an embodiment, at least one graphical component is connected with at least one other graphical component via a connection having a predefined condition. Further, the at least one graphical component is connected with at least one other graphical component such that the output of the at least one component forms an input to the at least one other graphical component.

In one embodiment, the GUI provided by the GUI module 212 may facilitate the user 104 to drag and drop each of these graphical components on a canvas of the GUI in order to design and/or build the graphical pipeline. The graphical pipeline formed comprises the channel components, the processor components, the data store components and the emitter components. The channel components may include open source components such as Apache™ Kafka 302-1 and/or RabbitMq™ 302-2 capable of buffering the streaming data to be processed. The Apache™ Kafka 302-1 and/or RabbitMq™ 302-2 put the data into the real-time streaming analytics platform. The data being processed may require higher processing time and accordingly may have a higher data rate. Therefore, the streaming data is buffered and/or queued in the channel components including the Apache™ Kafka and/or RabbitMq™.

In an embodiment, the processor components may comprise a parser processor, a complex event processing (CEP) processor, a custom processor, a predictive modeling markup language (PMML) processor, a filter processor, an index processor, a persistence processor, an alert processor, an enricher processor and the like. The emitter components may comprise a Kafka Producer, a Router, a RabbitMQEmitter and a StreamingEmitter. Each of the emitter components may be used to transfer the data being processed to external systems or third party systems. In one example, the Kafka producer may transfer the data processed corresponding to a message to a specific topic from where a third party system may use the message for further use. The Router Emitter may be used to transfer the message from one subsystem to another based on the rules provided in the sub system integration. RabbitMQEmitter may transfer the data processed corresponding to a message to a specific exchange from where a third party system can start consuming. The StreamingEmitter is used to push data to Websockets so that UI can render the streaming data for graphing and charting.

Figure 4:
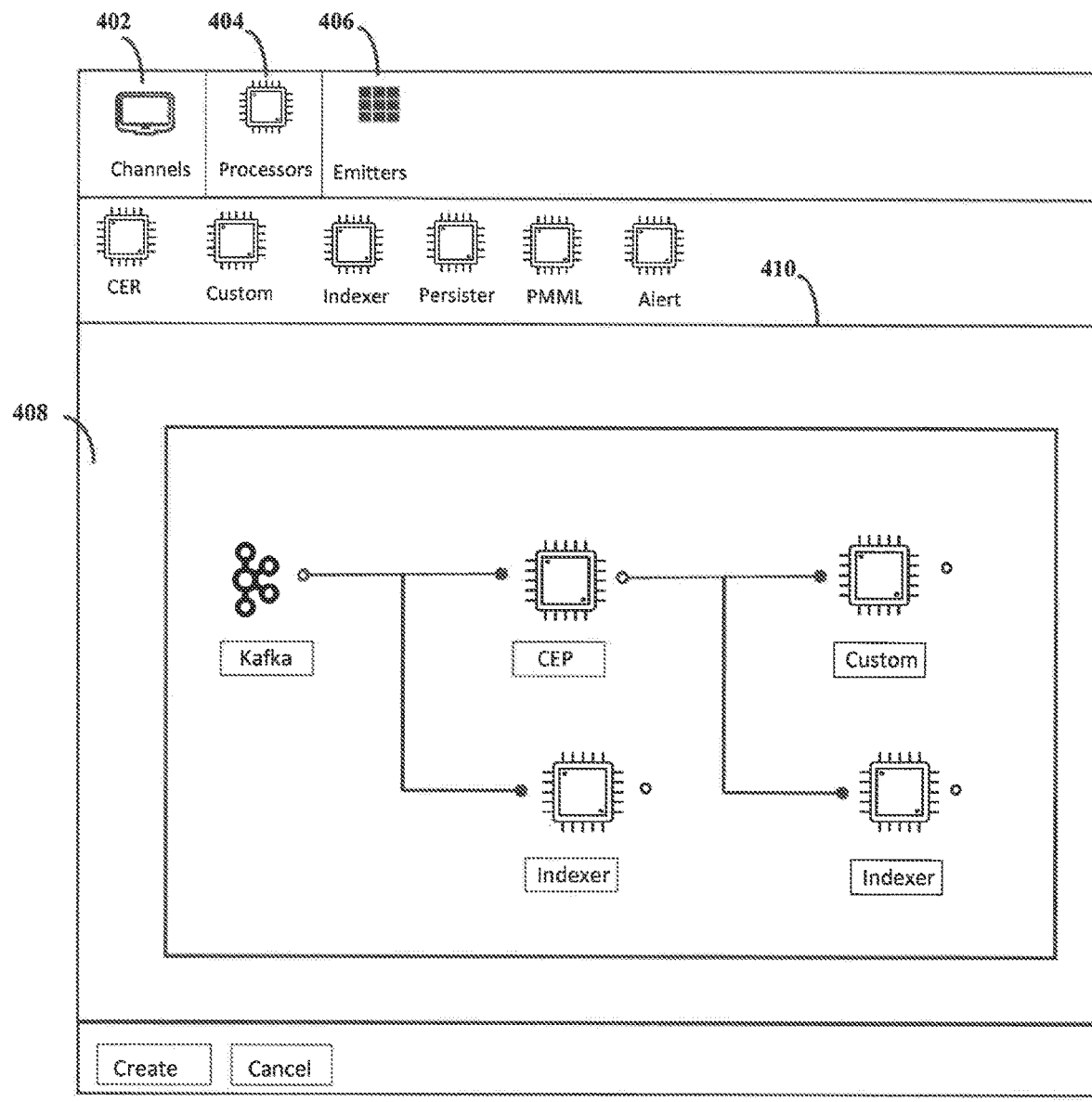
FIG. 4-6 illustrates an example illustrating a Graphical User Interface (GUI) of the system, in accordance with an embodiment of the present disclosure.

In one embodiment, a cluster provisioning tool 306 provides a cluster of computing nodes/processing elements that may be utilized for the execution of the applications based upon the graphical pipeline designed using the GUI module 212. The cluster provisioning tool 320 installs and/or deploys various servers required for the stream analytics. Therefore, the graphical pipeline designed may be pushed/ uploaded on the servers available (also referred to as running pipeline) for stream analytics processing in real time. The running pipeline may then be utilized to execute the applications developed using the application module 216. As shown, third party applications 308 may render the applications processed by the real-time streaming analytics platform 102. The processed data may also be stored in the persistence store such as data store 314 from where BI tools 310 may query and create visualizations. FIG. 4 illustrates an exemplary graphical pipeline designed using the GUI module 212 in accordance with an embodiment of the present disclosure.

As illustrated in FIG. 4, the GUI comprises channel components 402, processor components 404 and emitter components 406 that may be dragged and dropped on a canvas 408 for designing a graphical pipeline (also referred to as GUI pipeline). Further, an exemplary GUI pipeline 410 is illustrated containing an Apache™ Kafka channel. The Apache™ Kafka channel is connected to a CEP processor. The Apache™ Kafka channel, in parallel, is further connected to an Index processor. Similarly, the CEP processor is further connected with the custom processor and the indexer processor. Therefore, the GUI module 212 enables the user 104 to either design the GUI pipeline 410 sequentially or in parallel or in combination. In an embodiment, the connections connecting the components in the GUI pipeline 410 may be subjected to certain predefined conditions such that when the predefined conditions are met, the data may flow from one component to the other. In one example, the messages received from the Apache™ Kafka channel may be transferred to CEP processor for processing when a predefined condition is met. Similarly, the messages received from the Apache™ Kafka channel may be indexed using Indexer processor when another predefined condition is met. The conditions associated with the connections may be set and/or configured by the user 104 using the configuration module 214 shown in FIG. 3. For instance, the user 104 may perform an operation such as click operation on the connection and configure a precondition for the said connection connecting the two graphical components.

In one embodiment, the user 104 may configure the channel components 402, the processor components 404 and the emitter components 406 in the GUI pipeline 410 using the configuration module 214. More specifically, the user 104, via the configuration module 214, may configure the parameters associated with the functionalities of each of these components. The configuration of the channel components 402 (Apache™ Kafka or RabbitMq™) by the configuration module 214 includes configuration associated with the messages being read from these channel components 402 for further processing. In one example, the configuration includes defining topic name for the particular message types. In one example, the topic name associated with stocks of particular companies may be "Stock Ticker". The Apache™ Kafka channel will be accordingly configured to route messages to other components in the pipeline corresponding to the topic "Stock Ticker". Such messages may be associated with data streams received from stock exchanges. Further, the configuration of the channel components includes specifying parallelism, message type, and configuration type for the messages. The parallelism indicates facilitating processing of multiple messages in parallel based on the number specified on GUI as an input by the user 104. The message type indicates the message that will be read from that particular Kafka topic. The user 104 may select from a list of messages that are configured in the system so far and also choose a couple of fields from the list of fields present in a message. The configuration type indicates a single message or multiple messages or a custom message to be processed by a specific pipeline.

In one embodiment, the configuration module 214 may be utilized by the user 104 to configure the messages read from the channel components 402. For instance, the configuration of messages include specifying the structure of the message, defining the fields associated with the message, specifying whether to index the message using the indexer processor or to store the message in NoSQL data store using the persister processor, encrypt the message stored in the NoSQL data store using the persister processor. The structure of the message may be JSON, text, XML, comma-separated, and the like. The user 104 may, in real time, modify or update the configuration of the message and the modified or updated configuration is applied on the pipeline automatically without restarting the pipeline. Accordingly, the message configuration updated is also applied on the running pipeline provisioned through the cluster provisioning tool 306. In one example, assume a new field such as "computer name" is configured for the message, and then the new field "computer name" will be displayed along with the message during execution of the pipeline.

In one embodiment, the messages read from the channels 402 may be parsed using the parser processor. The parser processor may parse the messages of different formats including JSON, text, and XML etc. The user 104 may configure the message structure of specified type (e.g. comma-separated) using the configuration module 214 and accordingly select a particular parsing algorithm to parse the message having the message structure of the specified type. In accordance with an embodiment of the present disclosure, the messages read from the channels 402 may be parsed via a parser present in these channels 402 itself. More particularly, an inbuilt parser may be provided within these channels 402, wherein the inbuilt parser itself may be configured to parse the messages read from these channels 402. In some embodiments, various fields associated with the plurality of messages may be enriched by the enricher processor. In one example, if a field associated with an incoming message is having a null value, the enricher processor may be configured to set the default value as "0" for this field having the null value. In another example, the enricher processor may be configured to enrich the field in an incoming message by replacing the field name. For instance, if an incoming message contains stock code "Goog", the ericher processor may enrich the field name to "Google Inc".

The message(s) parsed may be subjected to further processing based on business logic/rules configured on the custom processor. In one embodiment, the messages(s) parsed may be further processed through the filter processor such that at least one of the message(s) parsed satisfying a predefined condition associated with the filter processor is capable of being forwarded to at least one of the custom processor, CEP processor, PMML processor and the alert processor. In one example, the filter processor may define the condition such that only the messages received for a predefined time interval is to be subjected for custom processing using the custom processor. In another example, the filter processor may define the condition such that outcome of at least of messages processed through the custom processor is to be notified to the relevant stakeholders using the alert processor. The user 104 may specify/configure, via the configuration module 214, custom business logic on each of the messages read from the channel components 402. In one example, if the messages received are associated to a stock ticker, the user 104 may configure logic to compute a percentage change of stock price based on current price and last closed price of a stock of a particular company. The user may configure, via the configuration module 214, the custom logic on the custom processor by providing name of the file containing the logic or specifying a class implementation that computes the percentage change of stock price based on current price and last closed price. Similarly, the user 104 may provide any customized logic of execution on the graphical components in the graphical pipeline through the configuration module 214. Further, the configuration of the custom processor includes specifying parallelism to indicate providing single or multiple instances of custom logic processing based upon the number of instances selected by the user 104. The customized logic is applicable on the custom processor dynamically. Accordingly, the same logic is published to a relevant server(s) in the stream analytics pipeline (running pipeline) responsible for executing the logic associated with the custom processor. In one embodiment, the user 104 may be enabled to upload business logic jar which is used in the pipeline of a particular subsystem to execute any custom operations and logic as per business requirement. The user 104 may write his/her logic and bundle it in form of a jar which can then be uploaded and used in the pipeline.

In one embodiment, the output of the custom processor may be utilized by the alert processor in order to generate notification alerts to the relevant stakeholders. For instance, the alert processor may generate a notification alert when a stock price of a particular company falls below a predefined value. In another example, the alert processor may generate a notification alert when a percentage change (calculated by the custom processor as described above) is above or below a specific value. In an embodiment, the alerts generated may be sent to stakeholder based on workflow configured corresponding to a specific alert using the alert processor. Further, the configuration of the alert processor includes specifying parallelism to indicate providing single or multiple instances of alert processing based upon the number of instances selected by the user.

In one embodiment, the CEP processor performs complex event processing based upon windowing mechanism. That is, the CEP processor may process data corresponding to a particular time window as mentioned in a query received from the user 104. In one example, the CEP processor may process data pertaining to a window of 10 second. The user 104 may provide a query to be executed from a query engine, a message on which the query is to be executed. Based upon the query and the message, the part of the data will be retrieved that is applicable for processing and analytics. In one example, the user 104 may provide a query for searching top ten gainers in last one minute. The business logic for top gainer may be written/configured by the user 104 using the configuration module 214. Similarly, other example of business logic may be associated to searching for top 10 gainers based upon highest % change in the last one minute. The user may perform these operations corresponding to windowing data from the GUI. Further, the configuration of the CEP processor, via the configuration module 214, includes specifying parallelism to indicate providing single or multiple instances of CEP logic processing based upon the number of instances selected by the user.

In one embodiment, the PMML processor may perform data analytics on the streaming data using predictive models.

The predictive models use a training dataset for providing an outcome for real time data. The predictive models may be stored in different formats including binary, and text etc. These models may be exported into standardized format which is a PMML format. The PMML format is similar to markup languages such as HTML and/or XML. The user may select the PMML file from the GUI to perform predictive analytics in order to provide recommendation to the user. In one example, the recommendation may be buying or selling a stock if the stock prices rise or falls respectively in a real time. Similarly, the PMML processor may provide recommendations with respect to marketing strategies, customizing the product offerings based upon demographic profile and buying patterns of buyers, and the like. Further, the configuration of the PMML processor includes specifying parallelism to indicate providing single or multiple instances of PMML analytics processing based upon the number of instances selected by the user. Further, the processor components may include a transformation processor capable of transforming and/or normalizing the data. In one example, if an input value received by the transformation processor is 0.99, the input value may be normalized to unity or one by the transformation processor. The normalization logic may be defined by the user 104 on the transformation processor.

In one embodiment, any time, while the message is being parsed, processed, and/or analyzed, the said message may be indexed in an indexer 316 using the indexer processor or persisted into a NoSQL store 314 such as Apache™ HBASE™ using the persister processor. The indexer processor indexes the messages based upon elastic search technology. Further, the indexer processor is configured to indicate whether to index the messages in form of batches. If the messages are indexed in batches, the user may configure a batch size through the configuration module 214. Further, the configuration of the indexer processor includes specifying parallelism to indicate providing single or multiple instances of indexing based upon the number of instances selected by the user.

Further, the user may configure to store the messages in the NoSQL store 314 using the persister processor. The data is stored on basis of time based slicing or time based partitioning technique. That is instead of storing the entire data in a single table, several tables are created, wherein each table will store data corresponding to a particular time stamp. The time based storage would help to search the data efficiently, as the table storing the data required by the user could be identified in faster manner. Similarly, such storage of data also helps to delete the data in an efficient manner. Specifically, the user may indicate the time stamp corresponding to which dataset stored may be deleted. Therefore, the time based slicing or time based partitioning enables optimizing the computing resources and accordingly reducing the computation overheads.

In one embodiment, the user may configure to index and store the data. The metadata information associated with the data may be indexed in the indexer 316 using the indexer processor while the data itself may be persisted in the NoSQL data store 314. In one example, metadata information of a video including video length, video format, etc may be indexed in the indexer 316 and the binary file (indicating the video itself) may be persisted in the NoSQL data store 314. This is particularly useful to efficiently search for the data. In one example, the user may provide a query though the query engine to search for the video. The system 102 will search the indexer 316 to locate the metadata information of the video which will further facilitate to identify the binary file (indicating the video) to be retrieved from NoSQL data store 316 efficiently.

In an embodiment, distributed cache 312 as shown in FIG. 3 is configured to store one or more datasets that are required to be accessed at a faster rate. More particularly, instead of accessing the data from the system database 222 or the NoSQL data store 314, the processor components or the one or more pipelines may access the one or more datasets from the distributed cache 312 itself thereby facilitating faster access of the required data. In one embodiment, the real-time streaming analytics platform 102 facilitates to configure the user specified key generation logic which may be used to properly distribute the data across nodes as well as for efficient querying. In one example, data corresponding to a region may be stored on one physical node. So when data of that particular region is queried, only one node is hit instead of hitting all the nodes in the cluster.

Figure 5:
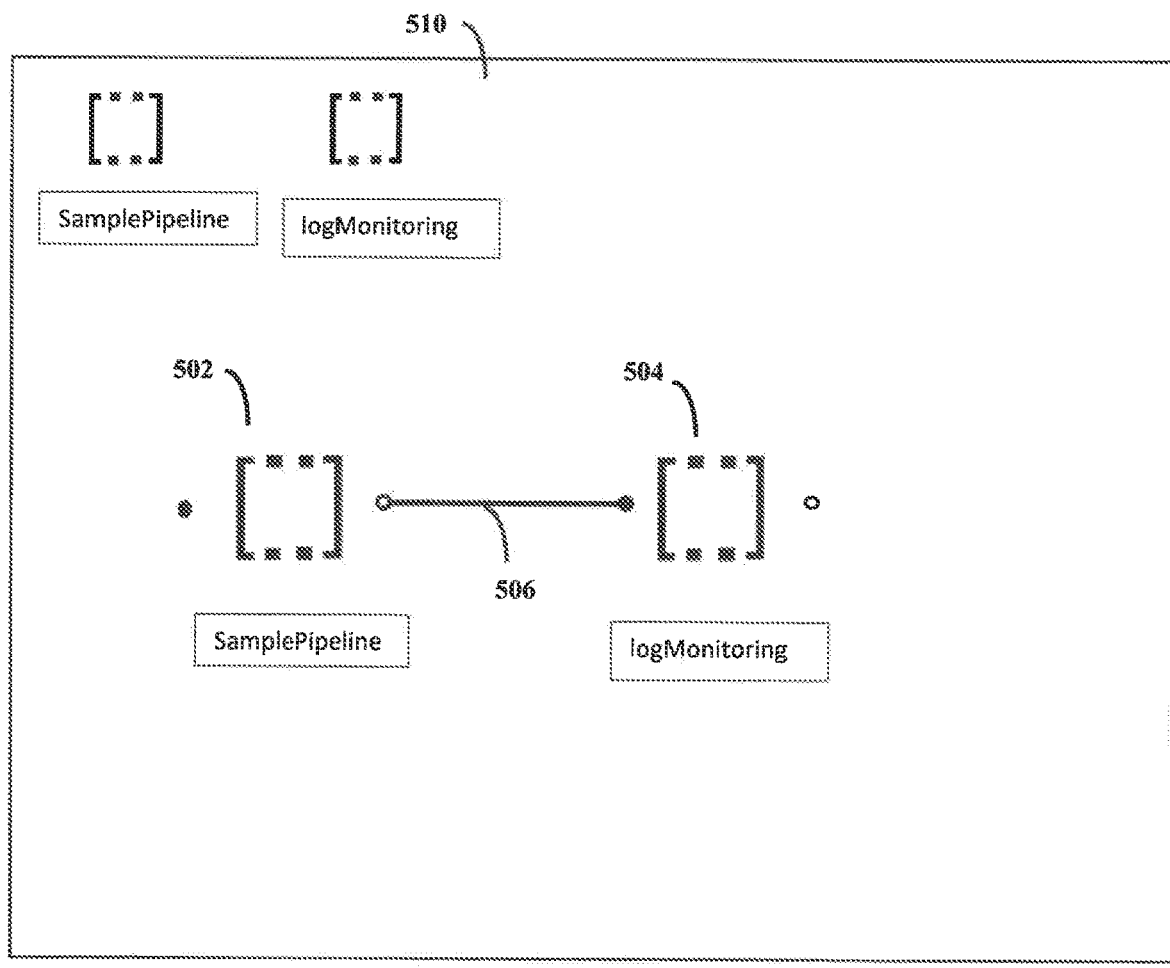

In one embodiment, the components collectively forming the pipeline using the GUI module 212 may be referred to as a sub-system. Therefore, the GUI pipeline 410 shown in FIG. 4 may be considered to be sub-system formed of five different components. The sub-system may be defined to perform a specific task. The user may form several such sub-systems defined to perform varied tasks using the GUI module 212. In an embodiment, each sub-system may be integrated with another sub-system based upon configuration of integration rules through the configuration module 214. In order to facilitate the integration of sub-systems, the user 104 may be enabled to specify a rule on an edge connecting two sub-systems. One such integration is shown in FIG. 5. As shown a sub-system SamplePipeline 502 is connected to a LogMonitoring 504 via an edge component 506. The user 104 may drag and drop the sub-systems (SamplePipeline 502, LogMonitoring 504) from subs-system panel 510 as shown in FIG. 5. The user 104 may be enabled to click on the edge component 506 to configure a rule, via the configuration module 214, that facilitate the integration of the sub-system SamplePipeline 502 and the LogMonitoring 504.

The integration of sub-systems facilitates to build system (s) that enables to execute a main task requiring execution of specific tasks of the sub-systems. In one example, consider a system needs to be designed for analyzing text data, audio data and video data accessed on an internet. In this example, using the GUI module 212, the user may design a first sub-system (parser) capable of parsing data accessed on the internet to determine type of each dataset of the data. Further, the user may design a second sub-system (text analyzer), a third sub-system (audio analyzer) and a fourth sub-system (video analyzer) capable of analyzing text data, audio data and video data respectively. Therefore, in order to achieve the objective of the system to analyze the text data, the audio data and the video data, the user may, using the GUI module 212, integrate the first sub-system (parser) to the second sub-system (text analyzer), the third sub-system (audio analyzer) and the fourth sub-system (video analyzer). In this example, the edge components between the first sub-system (parser) and the second sub-system (text analyzer) may be configured with a rule that would indicate the at least one dataset of the data having data type as text shall be passed on to the second sub-system (text analyzer). Similarly, the rules may be configured corresponding to the edge components integrating the first sub-system (parser) with the third sub-system (audio analyzer) and the fourth sub-system (video analyzer).

Figure 6:
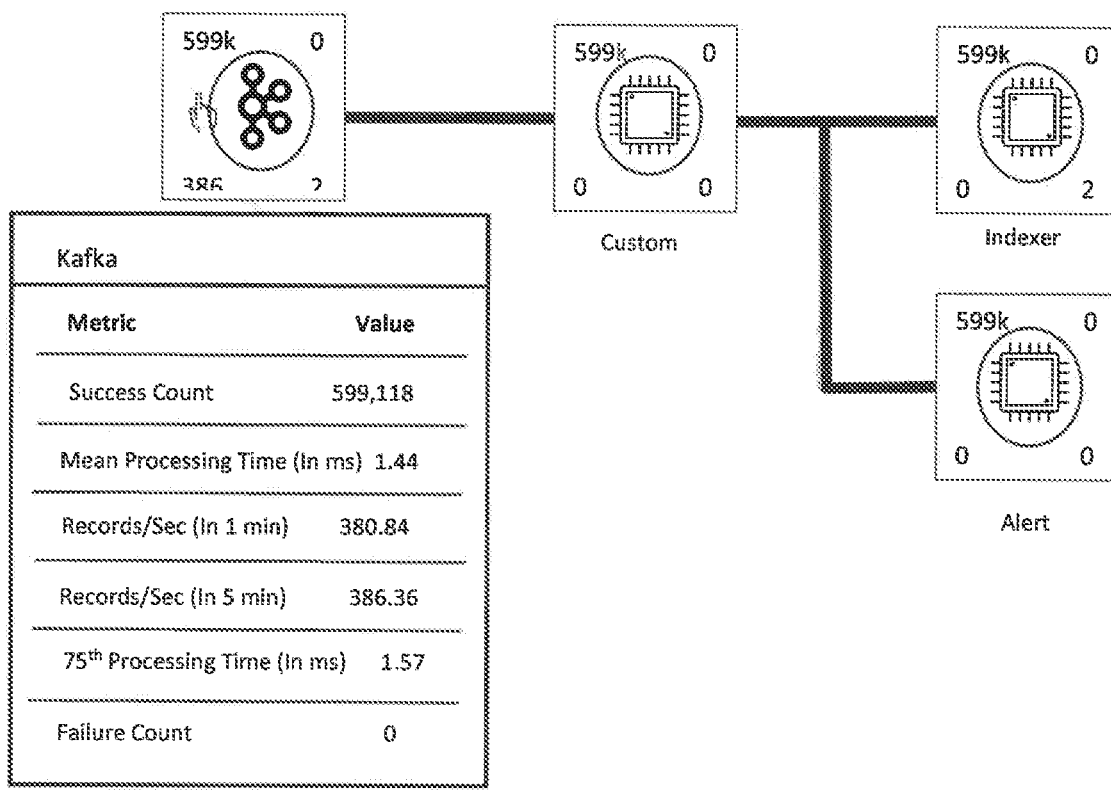

In an embodiment, the real-time streaming analytics platform 102 may be able to notify the running pipeline regarding updating structure of messages without restarting the pipeline. The user may create and/or update messages, rules, business logics and alerts whenever required. The running pipeline may validate the changes without restarting the pipeline and hence is capable of handling the modifications or changes in real time. Further, the running pipeline may be monitored, via the monitoring module 218, to check the performance of each of the servers in the running pipeline using hooks. The monitoring module 218 enables to compute performance metrics including number of messages being processed, time required to process the messages, mean processing time, etc. These performance metrics may be published to the user 104 on the GUI. Further, performance of individual components of the running pipeline may be displayed to the user in distinct colors along with the performance metric measured corresponding to these components on the GUI. FIG. 6 illustrates exemplary metrics and monitoring results published on the GUI. As shown in FIG. 6, a pipeline is shown containing four components. Further, the performance metrics corresponding to each component in the running pipeline is represented with distinct colors on the GUI. In one aspect, the metric in green color indicates number of tasks being successfully executed by a particular component whereas the metric in the red color indicates number of tasks failed to execute. Further, a detail metric list may be displayed corresponding to the component when a mouse is hovered on that component. As shown in FIG. 6, the metric list corresponding to a component is displayed, wherein the metric list comprises success count; mean processing time, records/sec in predefined time interval, failure count and the like.

In one embodiment, the real-time streaming analytics platform 102 may enable the user to tune the components and/or processors in the running pipeline based upon the metrics published on the GUI. Specifically, based upon the metrics associated with a specific component/processor, the user may specify changes in the configuration of the specific component/processor through the configuration module 214. In one example, the user may change the parallelism of the particular component to increase number of instances required to process the tasks and thereby enhance the processing speed. The effect of tuning is applicable on the component/processor in the running pipeline automatically. In an embodiment, the GUI pipelines, the integrated sub-systems designed using the GUI module 212 may be stored in the system database 224 for future use. For example, a GUI pipeline capable of processing and analyzing stream messages corresponding to stock ticker may be stored as a "stock ticker template". The "stock ticker template" may be used for future scenarios wherein messages received from stock exchanges may be processed and analyzed. Similarly, an integrated system of sub-systems enabled to process and analyze internet data may be stored as an "internet data integration template". The "internet data integration template" may then be utilized in future when similar analysis of the internet data is required. The user may not be required to re-design the GUI pipeline or re-integrate the sub-systems but directly retrieve the templates from the system database 224. The templates may be easily imported/exported through the GUI module 212.

Thus, the real-time streaming analytics platform 102 provides the GUI module 212 that enables the user to design a graphical pipeline comprising multiple components (channels, processors and emitters). Further, the graphical pipeline designed is applicable to the running pipeline of servers provisioned through the cluster provisioning tool 306. Each of the components in the graphical pipeline may be configured with different parameters by the user using the configuration module 214. The user may configure to integrate the multiple sub-systems through the GUI. Further, the user may control the configuration of messages, rules, business logics, and alerts through the configuration module 214. The configuration is automatically notified to the running pipeline in real time. Further, the monitoring module 218 facilitates to monitor the running pipeline and recommend changes in the running pipeline based upon the monitoring of performance of the components.

Figure 7:
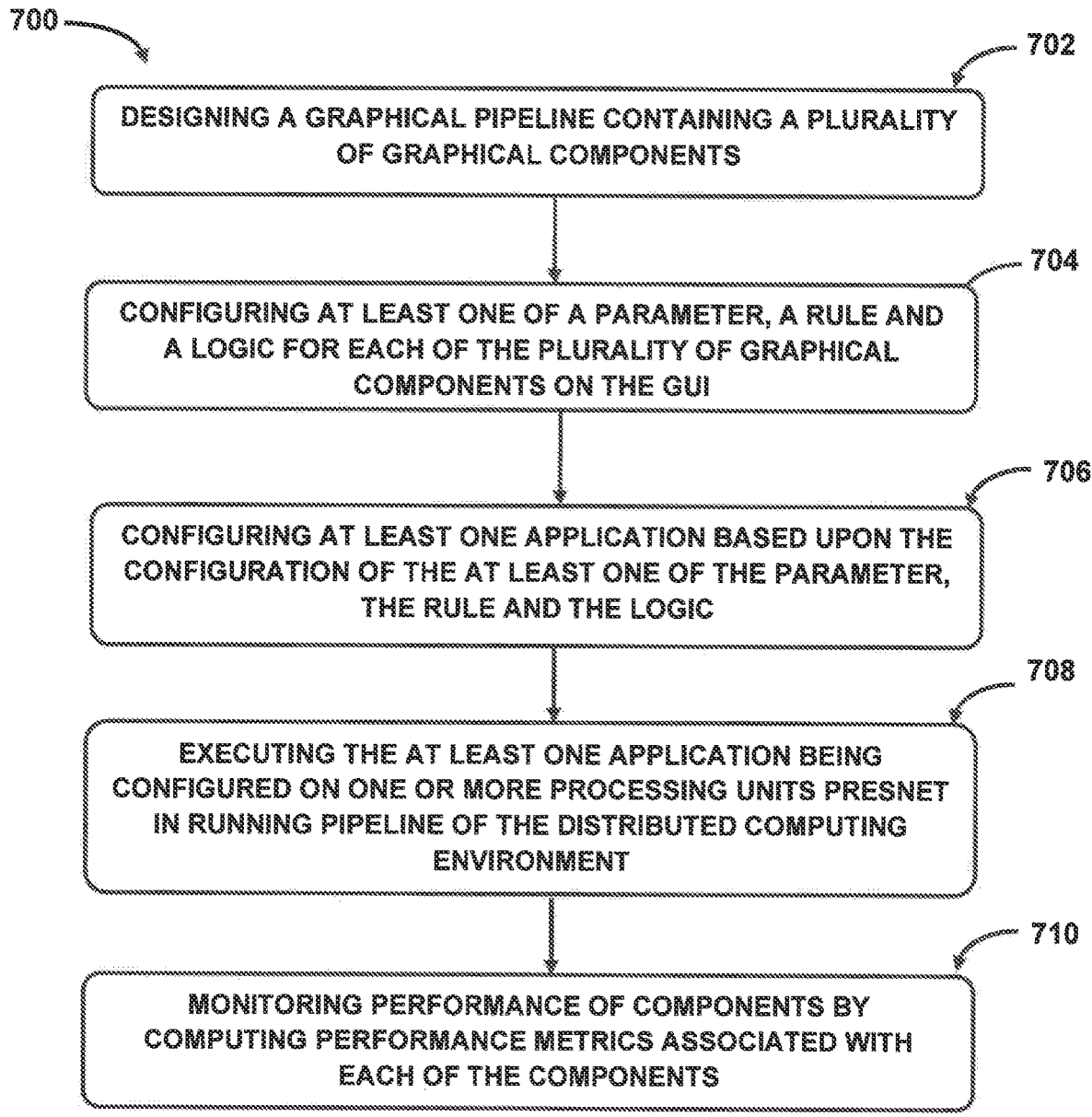
FIG. 7 illustrates the method for processing one or more real time data streams captured in a distributed computing environment, in accordance with an embodiment of the present disclosure.

Referring now to FIG. 7, a method 700 for processing one or more real time data streams captured in a distributed computing environment is shown, in accordance with an embodiment of the present disclosure. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the disclosure described herein. Furthermore, the method can be implemented in any suitable hardware, software, firmware, or combination thereof. However, for ease of explanation, in the embodiments described below, the method 700 may be considered to be implemented in the above real-time streaming analytics platform 102 (or the system 102).

At block 702, a graphical pipeline containing a plurality of graphical components may be designed. In one implementation, the graphical pipeline may be designed using the GUI module 212 of the real-time streaming analytics platform 102.

At block 704, at least one of a parameter, a rule and logic may be configured for each of the plurality of graphical components in the graphical pipeline. In one implementation, the at least one of a parameter, the rule and the logic may be configured using the configuration module 214 of the real-time streaming analytics platform 102.

At block 706, at least one application may be configured based upon the configuration of the at least one of the parameter, the rule and the logic. In one implementation, the at least one application may be configured using the application module 216 of the real-time streaming analytics platform 102.

At block 708, the at least one application being configured may be executed on one or more processing units present in running pipeline of the distributed computing environment. In one implementation, the execution of the at least one application may be provisioned through the cluster provisioning tool 306 coupled the real-time streaming analytics platform 102.

At block 710, performance of each of the graphical components may be monitored by computing performance metrics associated with each of the graphical components. In one implementation, the performance of each of the graphical components may be monitored using the monitoring module 218 of the real-time streaming analytics platform 102.

Although implementations for methods and systems for processing one or more real time data streams captured in a distributed computing environment have been described in language specific to structural features and/or methods, it is to be understood that the appended claims are not necessarily limited to the specific features or methods described. Rather, the specific features and methods are disclosed as examples of implementations for processing one or more real time data streams captured in a distributed computing environment.

We claim:

1. A system for processing one or more real time data streams captured in a distributed computing environment, the system comprising:
a hardware processor; and
a memory coupled to the hardware processor, wherein the hardware processor is configured to execute computer-executable instructions stored in the memory for:
providing a graphical user interface (GUI) that enables a user to design a graphical pipeline containing a plurality of graphical components, wherein each of the plurality of graphical components indicates a phase in a pipeline that is capable of being operated in a distributed computing environment, wherein the graphical components collectively forming the pipeline form a sub-system by using a GUI module, wherein the sub-system is integrated with another sub-system based upon a configuration by the user of integration rules specified on an edge connecting the two sub-systems through a configuration module;
displaying the plurality of graphical components on the GUI and configuring at least one of a parameter, a rule and a logic for each of the plurality of graphical components on the GUI, wherein the at least one of the parameter, the rule and the logic is configured based upon a type of each graphical component, and wherein the at least one of the parameter, the rule and the logic is configured to enable at least one processing unit, in the pipeline, to perform one or more computational tasks corresponding to each graphical component, and wherein the plurality of graphical components are configured in real time without restarting the pipeline, and wherein the configuration of each of the plurality of graphical components includes specifying or changing parallelism of the graphical component to increase a number of instances required for processing the one or more computational tasks, to indicate providing single or multiple instances of the graphical component;
configuring at least one application based upon the configuration of the at least one of the parameter, the rule and the logic, wherein the at least one application being configured is further executed via one or more processing units in the pipeline, and wherein the execution of the at least one application enables the one or more processing units, in the pipeline, to perform a series of computational tasks;
computing performance metrics associated with at least one of the plurality of graphical components, wherein the performance metrics include at least one of: a number of messages being processed, a time required to process the messages, and a mean processing time computed; and
monitoring the performance metrics of the at least one of the plurality of graphical components when processing one or more real time data streams captured in the distributed computing environment, and recommending changes in the pipeline based upon the monitoring of the performance metrics, wherein the one or more real time data streams are buffered or queued in a form of a plurality of heterogeneous messages, wherein the plurality of heterogeneous messages are received from channel components buffering the one or more real time data streams in the form of the plurality of heterogeneous messages, wherein the messages in the plurality of heterogeneous messages are configured by the user for processing of the plurality of heterogeneous messages, wherein the configuration of the messages by the user comprises specifying a structure of at least a portion of the messages, wherein specifying a structure of at least a portion of the messages comprises one of selecting a list of messages configured in the system, or choosing a couple of fields from a list of fields present in the messages, wherein the configuration of the messages further comprises applying a custom logic or a custom rule by a custom processor in order to process the plurality of messages, wherein the configuration of the messages by the user includes one of modifying or updating the messages in real time and is applied on the pipeline automatically without restarting the pipeline.

2. The system of claim 1, wherein the type of each of the plurality of graphical components comprises one of a processor component, a channel component, a data store component and an emitter component, and wherein at least one graphical component is connected with at least one other graphical component via a connection having a predefined condition.

3. The system of claim 2, wherein the processor component comprises one of a parser processor, a complex event processing (CEP) processor, a custom processor, a predictive modeling markup language (PMML) processor, a filter processor, an index processor, a persistence processor, an enricher processor and an alert processor.

4. The system of claim 3, wherein the parser processor is enabled to parse at least one of the plurality of messages.

5. The system of claim 3, wherein the CEP processor is enabled to process data corresponding to a predefined time window based upon a query received from a user, and wherein the data is associated with at least one of the plurality of messages.

6. The system of claim 5, wherein the custom processor is enabled to execute a customized logic, defined by the user, on at least one of the plurality of messages.

7. The system of claim 6, wherein the alert processor is enabled to generate notification alerts based upon the processing of the data or the execution of the customized logic on the at least one of the plurality of messages.

8. The system of claim 3, wherein the PMML processor is enabled to perform predictive analytics on data associated with at least one of the plurality of messages.

9. The system of claim 3, wherein at least one of the plurality of messages is indexed partially or completely using the index processor.

10. The system of claim 3, wherein at least one of the plurality of messages is stored partially or completely in a data store using the persistence processor, and wherein the at least one of the plurality of messages is stored on a basis of appropriate partitioning logic, comprising a time based slicing or a time based partitioning technique.

11. The system of claim 2, wherein the channel component is enabled to perform the computational task of buffering or queuing the one or more real time data streams captured in the distributed computing environment.

12. The system of claim 11, wherein the emitter component is enabled to transfer processed data, corresponding to at least one of the plurality of messages, to one or more external systems or third-party systems, wherein the emitter component uses a Router Emitter for transferring the processed data from one sub-system to another sub-system based on the configuration of integration rules.

13. The system of claim 1, wherein the performance metrics computed are further displayed to the user on the GUI.

14. The system of claim 1, comprising a cluster provisioning tool configured to provide a cluster of computing nodes or processing elements utilized for the execution of applications based upon the graphical pipeline, wherein the graphical pipeline is pushed or uploaded on servers for stream analytics processing of the graphical pipeline in real-time.

15. The system of claim 14, wherein a graphical pipeline or an integration of one or more graphical pipelines is registered as a template for computation of similar data streams.

16. The system of claim 1 further comprising computer-executable instructions stored in the memory for updating messages, rules, business logics and alerts associated with the graphical pipeline in real time without restarting the pipeline.

17. The system as claimed in claim 1, further configured to execute each of the plurality of graphical components, in parallel, on remote processing devices in the distributed computing environment, linked in a network.

18. A method for processing one or more real time data streams captured in a distributed computing environment, the method comprising:
providing, via a hardware processor, a graphical user interface (GUI) that enables a user to design a graphical pipeline containing a plurality of graphical components, wherein each of the plurality of graphical components indicates a phase in a pipeline that is capable of being operated in a distributed computing environment, wherein the graphical components collectively forming the pipeline form a sub-system by using a GUI module, wherein the sub-system is integrated with another sub-system based upon a configuration by the user of integration rules specified on an edge connecting the two sub-systems through a configuration module;
displaying, via the hardware processor, the plurality of graphical components on the GUI;
configuring, via the hardware processor, at least one of a parameter, a rule and a logic for each of the plurality of graphical components on the GUI, wherein the at least one of the parameter, the rule and the logic is configured based upon a type of each graphical component, and wherein the at least one of the parameter, the rule and the logic is configured to enable at least one processing unit, in the pipeline, to perform one or more computational tasks corresponding to each graphical component, and wherein the plurality of graphical components are configured in real time without restarting the pipeline, and wherein the configuration of each of the plurality of graphical components includes specifying or changing parallelism of the graphical component to increase a number of instances required for processing the one or more computational tasks, to indicate providing single or multiple instances of the graphical component;
configuring at least one application based upon the configuration of the at least one of the parameter, the rule and the logic, wherein the at least one application being configured is further executed via one or more processing units in the pipeline, and wherein the execution of the at least one application enables the one or more processing units, in the pipeline, to perform a series of computational tasks;
computing performance metrics associated with at least one of the plurality of the graphical components, wherein the performance metrics, include at least one of: a number of messages being processed, a time required to process the messages, and a mean processing time computed; and
monitoring the performance metrics of the at least one of the plurality of graphical components when processing one or more real time data streams captured in the distributed computing environment, and recommending changes in the pipeline based upon the monitoring of the performance metrics, wherein the one or more real time data streams are buffered or queued in a form of a plurality of heterogeneous; messages, wherein the plurality of heterogeneous messages are received from channel components buffering the one or more real time data streams in the form of the plurality of heterogeneous messages, wherein the messages in the plurality of heterogeneous messages are configured by the user for processing of the plurality of heterogeneous messages, wherein the configuration of the messages by the user comprises specifying a structure of at least a portion of the messages, wherein specifying a structure of at least a portion of the messages comprises one of selecting a list of messages configured in the system, or choosing a couple of fields from a list of fields present in the messages, wherein the configuration of the messages further comprises applying a custom logic or a custom rule by a custom processor in order to process the plurality of messages, wherein the configuration of the messages by the user includes one of modifying or updating the messages in real time and is applied on the pipeline automatically without restarting the pipeline.

19. The method as claimed in claim 18, further comprising executing each of the plurality of graphical components, in parallel, on remote processing devices in the distributed computing environment, linked in a network.

20. A non transitory computer readable medium embodying a program executable in a computing device for processing one or more real time data streams captured in a distributed computing environment, the program comprising:
program code for providing a graphical user interface (GUI) that enables a user to design a graphical pipeline containing a plurality of graphical components, wherein each of the plurality of graphical components indicates a phase in a pipeline that is capable of being operated in a distributed computing environment, wherein the graphical components collectively forming the pipeline form a sub-system by using a GUI module, wherein the sub-system is integrated with another sub-system based upon a configuration by the user of integration rules specified on an edge connecting the two sub-systems through a configuration module;

program code for displaying the plurality of graphical components on the GUI;

program code for configuring at least one of a parameter, a rule and a logic for each of the plurality of graphical components on the GUI, wherein the at least one of the parameter, the rule and the logic is configured based upon a type of each graphical component, and wherein the at least one of the parameter, the rule and the logic is configured to enable at least one processing unit, in the pipeline, to perform one or more computational tasks corresponding to each graphical component, and wherein the plurality of graphical components are configured in real time without restarting the pipeline, and wherein the configuration of each of the plurality of graphical components includes specifying or changing parallelism of the graphical component to increase a number of instances required for processing the one or more computational tasks, to indicate providing single or multiple instances of the graphical component;

program code for configuring at least one application based upon the configuration of the at least one of the parameter, the rule and the logic, wherein the at least one application being configured is further executed via one or more processing units in the pipeline, and wherein the execution of the at least one application enables the one or more processing units, in the pipeline, to perform a series of computational tasks;

program code for computing performance metrics associated with at least one of the plurality of graphical components, wherein the performance metrics include at least one of: a number of messages being processed, a time required to process the messages, and a mean processing time computed; and program code for monitoring the performance metrics of the at least one of the plurality of graphical components when processing one or more real time data streams captured in the distributed computing environment, and recommending changes in the pipeline based upon the monitoring of the performance metrics, wherein the one or more real time data streams are buffered or queued in a form of a plurality of heterogeneous messages, wherein the plurality of heterogeneous messages are received from channel components buffering the one or more real time data streams in the form of the plurality of heterogeneous messages, wherein the messages in the plurality of heterogeneous messages are configured by the user for processing of the plurality of heterogeneous messages, wherein the configuration of the messages by the user comprises specifying a structure of at least a portion of the messages, wherein specifying a structure of at least a portion of the messages comprises one of selecting a list of messages configured in a system, or choosing a couple of fields from the list of fields present in the messages, wherein the configuration of the messages further comprises applying a custom logic or a custom rule by a custom processor in order to process the plurality of messages, wherein the configuration of the messages by the user includes one of modifying or updating the messages in real time and is applied on the pipeline automatically without restarting the pipeline.

\* \* \* \* \*